(12) United States Patent
Miller

(10) Patent No.: US 6,837,949 B2
(45) Date of Patent: Jan. 4, 2005

(54) HEAT TACK APPLICATION FOR USE WITH THE MANUFACTURE GENERATOR ROTOR COILS AND OTHER COMPONENTS

(75) Inventor: Mark Lee Miller, Orlando, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 290 days.

(21) Appl. No.: 09/963,279

(22) Filed: Sep. 26, 2001

(65) Prior Publication Data

US 2003/0056895 A1 Mar. 27, 2003

(51) Int. Cl.$^7$ ................................................ H01B 13/06
(52) U.S. Cl. .................. 156/52; 156/306.9; 174/110 R; 174/120 R
(58) Field of Search ........................... 156/52, 53, 312, 156/324.4, 306.6, 306.9; 174/110 R, 110 E, 120 R

(56) References Cited

U.S. PATENT DOCUMENTS

| | | | | |
|---|---|---|---|---|
| 2,821,498 A | * | 1/1958 | Botts ........................... 156/53 |
| 3,539,409 A | * | 11/1970 | Stone ........................... 156/56 |
| 3,750,273 A | * | 8/1973 | Beddows ........................ 29/596 |
| 4,087,300 A | * | 5/1978 | Adler ........................... 156/184 |
| 4,239,802 A | * | 12/1980 | Smith et al. .................. 428/377 |

* cited by examiner

Primary Examiner—Blaine Copenheaver
Assistant Examiner—John L. Goff

(57) ABSTRACT

A heat tack application involves arranging an adhesive between a strand of conductive material and a strand of insulation material; applying a temperature of about 100–300° C. and a pressure of about 5–100 psi for about 5–120 seconds to tack the adhesive. A stack can thereby be formed, and a plurality of stacks assembled to form a nascent rotor coil that is subsequently arranged in a rotor slot. An applied temperature of about 100–500° C. and a pressure of about 100–1,500 psi can fully cure the adhesive after the coil is arranged within the rotor slot. Depending on the context of use, the conductive material may more generally be a first component, and the insulation material may more generally be a second component.

6 Claims, 5 Drawing Sheets

HEAT TACK APPLICATION FOR USE WITH THE MANUFACTURE GENERATOR ROTOR COILS AND OTHER COMPONENTS

FIELD OF THE INVENTION

The present invention relates in general to the field of heat tacking, and more particularly, to a method and apparatus of heat tacking two components with an adhesive. The present invention has particular application when used to tack a conductive strand to an insulation strand during the process of manufacturing rotor coils for use within the rotor slots of a generator of a power generator plant.

BACKGROUND OF THE INVENTION

Many power generation plants produce electricity by converting energy (e.g. fossil fuel, nuclear fission, hydraulic head, geothermal heat) into mechanical energy (e.g. rotation of a turbine shaft), and then converting the mechanical energy into electrical energy (e.g. by the principles of electromagnetic induction). For example, fossil fuel power generation plants typically use a turbine to convert the fossil fuel into mechanical energy and a generator to convert the mechanical energy into electricity.

One aspect of the above-described power generation scheme involves conductive copper coils located within axially extending slots of the generator's rotor (FIG. 1). The rotor coils carry a DC current, from which an AC current is induced. The rotor coils comprise individual copper strands that are separated by insulation to prevent electrical arcing, among other reasons. Slot cell or other types of insulation may also be used to sheath the entire rotor coil or portions thereof. The insulated coils are then usually wedged within the slots to inhibit vibration.

The manufacture of rotor coils typically involves the steps shown in FIG. 2. Nascent insulated strands are first "laid-up" by arranging an adhesive between a strand of conductive copper and a strand of insulation (Step 1). The copper/adhesive/insulation layer is then sandwiched by a padding to more uniformly distribute the heat and pressure to be applied during the subsequent press cycle. The padding/copper/adhesive/insulation/padding layering is then repeated about 5–20 times to form a plurality of stacks. The stacks are then loaded into a press (Step 2), and the press ramped up from room condition to about 500–1,000 PSI and about 100–200° C. within about 15–45 minutes (Step 3). The nascent coils are then allowed to dwell for about 20–40 minutes within the press (Step 4), and the press is then ramped back down to room condition within about 15–45 minutes (Step 5).

The press cycle cures the adhesive and provides adherence with the copper and insulation. The cured stacks are then unloaded from the press and unstacked to the 5–20 separate stacks or insulated strands (Step 6). The insulated strands can then be assembled into the rotor coils, and the rotor coils wedged into the rotor slots (Step 7) to perform the intended purpose of carrying DC current.

However, there are several disadvantages of this prior art rotor coil manufacturing process. One disadvantage involves the costly and time-consuming nature of such manufacturing process. For example, the lay-up process takes about ½ man hour to complete, the pressing process takes about 1½ man-hours to complete, and the unloading and unstacking process takes about ½ man-hour to complete. Thus, it takes a total of about 2½ man-hours to manufacture about 5–20 insulated strands. Another disadvantage involves physical and electrical variations among insulated strands. For example, the location of the strands and adhesive relative to the press can cause the strands and adhesive to receive different amounts of heat and pressure for different amounts of time, with those closer to the press receiving higher amounts of heat and pressure which can overcure the adhesive, while those farther from the press receiving lower amounts of heat and pressure which can undercure the adhesive.

There is thus a need to reduce the amount of time and cost needed to manufacture rotor coils. There is also a need to reduce variation among insulated strands. There is also a need for a tacking application that improves upon the prior art.

SUMMARY OF THE INVENTION

The present invention reduces the amount of time and cost needed to manufacture rotor coils. The present invention also reduces variations among insulated strands. The present invention also provides a tacking application that improves upon the prior art.

The present invention involves tacking two components and then subsequently more permanently attaching the two components. The present invention has particular application when used to tack a conductive strand to an insulator during the process of manufacturing a rotor coil, where the strand and insulator are tacked by an adhesive at one step in the coil manufacturing process, and the adhesive is then fully cured at a subsequent step in the coil manufacturing process. Moreover, use of a subsequent step in the coil manufacturing process that is already a requisite step in the overall rotor manufacturing process to fully cure the adhesive in the coils reduces overall rotor manufacturing costs by thousands of dollars and reduces manufacturing time, and constitutes a further aspect of the present invention.

One aspect of the present invention thus involves a method of temporarily attaching two components during an apparatus manufacturing process and then more permanently attaching the two components during a subsequent portion of the apparatus manufacturing process. This invention aspect comprises tacking a first component and a second component with an adhesive during an initial phase of the apparatus manufacturing process, the tacking performed by applying a temperature of about 100–300° C. and a pressure of about 5–100 psi for about 5–120 seconds to the first component, and then allowing at least a portion of the applied temperature and pressure to be transferred to the adhesive and to the second component, the first component having a greater thermoconductivy than the adhesive; and curing the adhesive during a subsequent phase of the apparatus manufacturing process.

Another aspect of the present invention involves a method of manufacturing a rotor coil for use within a generator of a power generation plant. This invention aspect comprises arranging an adhesive between a strand of conductive material and a strand of insulation material; applying a temperature of about 100–300° C. and a pressure of about 5–100 psi for about 5–120 seconds to the adhesive in order to tack the adhesive to the conductive and insulation materials, thereby forming an insulated conductor stack; assembling a plurality of stacks to form a nascent rotor coil; arranging the nascent rotor coil in a rotor slot; and curing the adhesive after the coil is arranged within the rotor slot.

Another aspect of the present invention involves a tacking apparatus. This invention aspect comprises a tray adapted to support at least a portion of a component to be tacked, the tray having a positioning device to help position the component on the tray and an urger to help secure the positioned component; a movable ram adapted to directed a pressure of about 5–100 psi onto the component; and a heater adapted to direct a temperature of about 100–300° C. onto the component, whereby the directed heat and pressure tack the component, the component including at least two elements and an adhesive, and the adhesive fully cured subsequent to the tack.

Further aspects, features and advantages of the present invention will become apparent from the drawings and detailed description of the preferred embodiments that follow.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

The invention described herein employs several basic concepts. For example, one concept relates to a method and apparatus for tacking two components and then subsequently more permanently attaching the two components. Another concept relates to reducing the amount of time and cost needed to manufacture rotor coils by initially tacking a conductive strand to insulation with an adhesive, and subsequently fully curing the adhesive. Another concept relates to the use of a subsequent step in the coil manufacturing process that is already a requisite step in the overall rotor manufacturing process and performed for reasons independent of curing the adhesive, to fully cure the adhesive in the coils and thereby reduce overall rotor manufacturing costs and time. Another concept relates to reducing variations within insulated strands by more precisely controlling the amount of time, heat, and pressure that the components receive, and/or by reducing the number of strands that are laid-up during the pressing cycle.

The present invention is disclosed in context of an exemplary rotor coil 10 and rotor coil manufacturing process. The principles of the present invention, however, are not limited to rotor coils 10 or rotor coil manufacturing processes, and can be used in connection with other articles of manufacture and manufacturing processes that require the adherence of two components, and particularly those articles and processes that use a curable adhesive to adhere the two components. One skilled in the art may find additional applications for the apparatus, processes, components, configurations, methods, and applications disclosed herein. Thus, the illustration and description of the present invention in context of an exemplary rotor coil 10 and rotor coil manufacturing process is merely one possible application of the present invention. However, the present invention has been found particularly suitable in connection with the manufacture of rotor coils 10.

As used herein, the term "lack" or "tacking" means to attach components with an adhesive and heat and pressure. A preferred way to tack involves partially curing or activating a thermoset adhesive to provide a bond strength of about 30–150 psi, as described in more detail below.

Figure 1A:
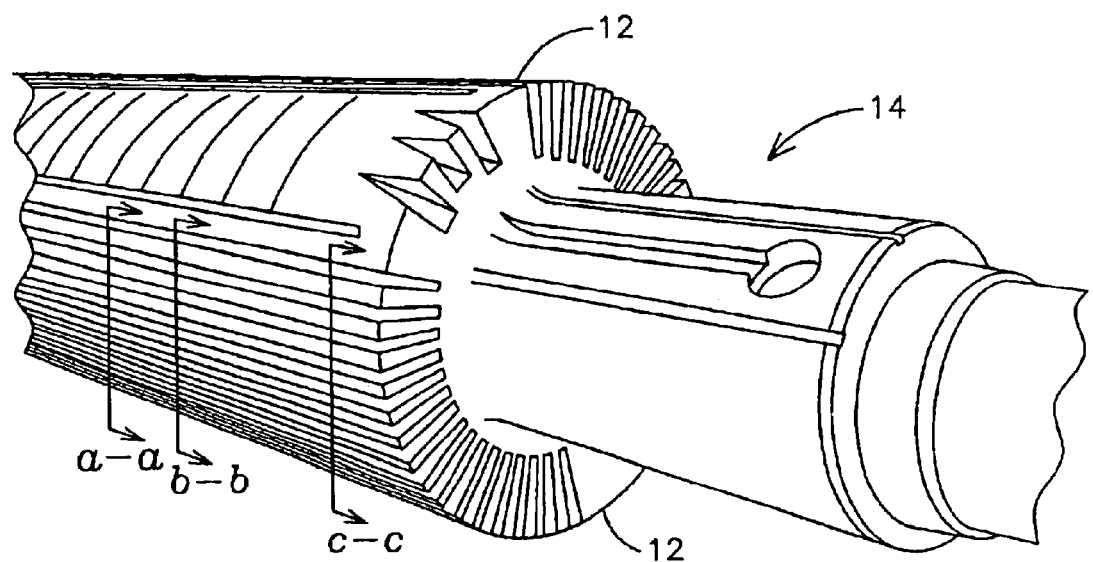
FIG. 1A is a perspective view of a generator rotor, showing axially extending slots within which rotor coils can be placed.
Figure 1B:
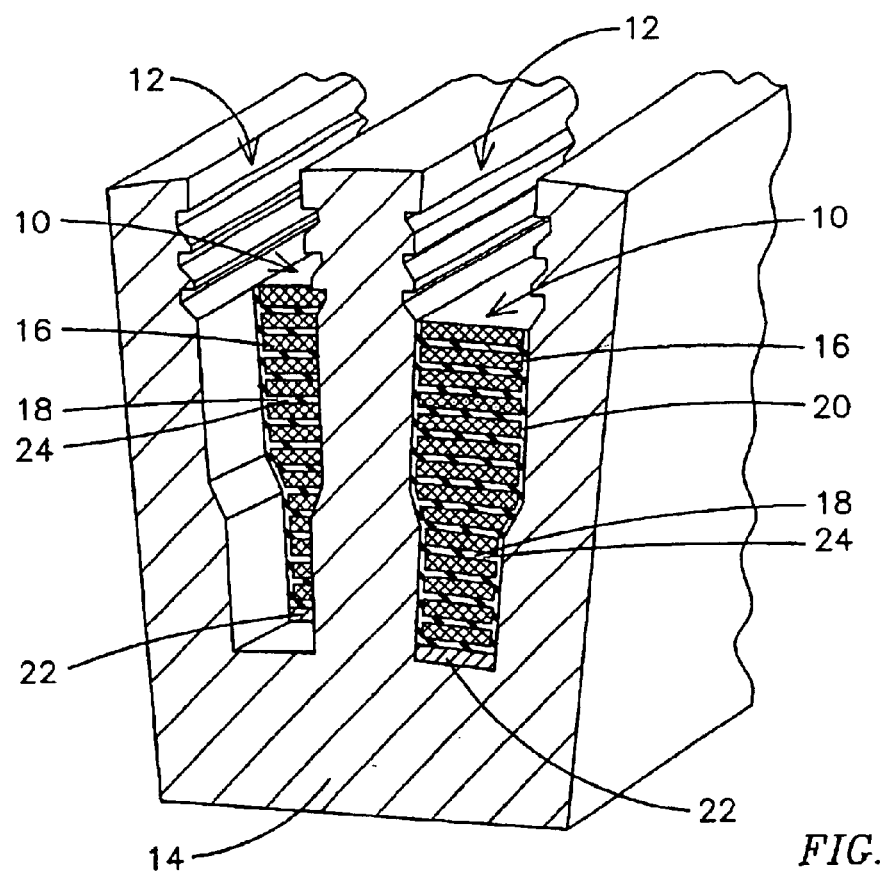
FIG. 1B is a exemplary detail perspective view of adjacent rotor slots taken along cuts lines a—a, b—b, or c—c, each slot containing a rotor coil formed by a plurality of conductive strands separated by insulation.
Figure 2:
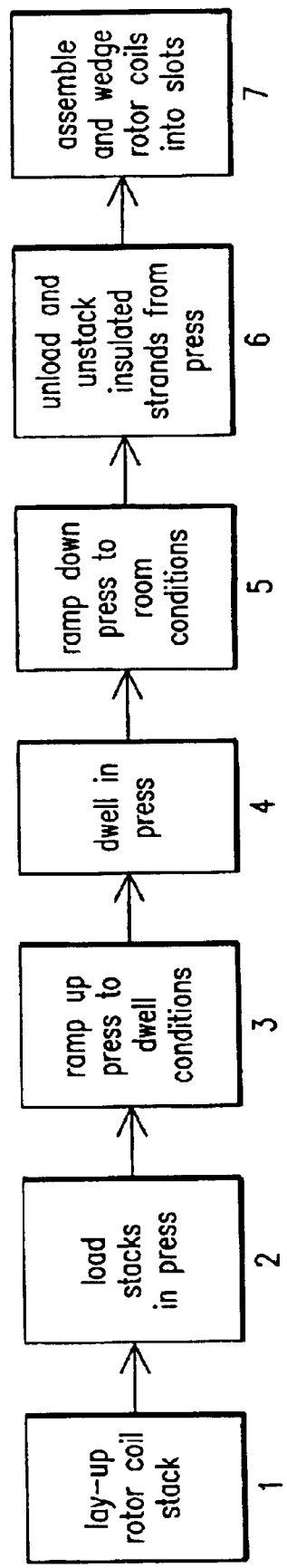
FIG. 2 is a flow chart of an exemplary prior art rotor coil manufacturing process.

FIGS. 1A and 1B show axially extending slots 12 formed along the exterior of the rotor 14. Conductive rotor coils 10 are sized and configured to be accepted into and secured by the slots 12, preferably, one coil 10 is tightly wedged into one slot 12. Each coil 10 typically comprises a plurality (e.g. 4–40) of individual elongated conductive strands 16 that carry a DC current. The stands 16 are separated by an insulator 18 to inhibit electrical arcing or conduction, among other reasons. As is understood by those skilled in the art, additional elements, such as groundwall insulation 20, steel strips 22, and fillers (not shown) can also be used to form the coil 10.

The conductive strand 16 (more generally, the first component 16) can be any of a wide variety of materials and configurations, depending on the context of use. For example, if used in connection with the exemplary rotor coil embodiment, the first component 16 can be made of a conductive material (e.g. copper) and have a generally elongated configuration (e.g. a length of about 540 feet and a perimeter of about 0.2–5 inches). Similarly, the insulator 18 (more generally, the second component 18) can be any of a variety of materials, depending on the context of use. For example, if used in connection with the exemplary rotor coil embodiment, the second component 18 can be made of an insulation material (e.g. polymer glass, polyester laminate, NEMA G-10 epoxy glass, NEMA G-11 epoxy glass, NEMA G-9 melamine glass, NOMEX, KEVLAR, as well as other suitable glasses, polymers, polyamides, matrix reinforcements, laminates, composites, combinations thereof and the like), and have a generally elongated configuration (e.g. a length generally similar to the first component and a perimeter of about 0.2–5 inches). The insulator 18 should have a dielectric strength of at least 1 kV per inch and preferably at least 4 kV per inch.

The exemplary embodiment uses an adhesive 24 to tack the conductive strand 16 and insulator 18. Like with the first and second components 16, 18, the adhesive 24 can be any of a variety of materials and configurations, depending on the context of use. For example, if used in connection with the exemplary rotor coil embodiment, the adhesive 24 can be made of a thermoset material, such as nitrile, phenolic, epoxy, acrylic, composites, combinations thereof and the like, and configured as thin uniform layer (e.g. about 0.5–2 mm), a thick uniform layer (e.g. about 2–20 nun), intermittent blobs or dabs, one or more lines, etc. In a preferred embodiment, the adhesive is advantageously B-staged or "dry" to-the-touch coated, where "dry" means that all or substantially all solvents are removed to leave no or essentially no insufficiently solidified and relatively weak liquid adhesive.

Figure 3:
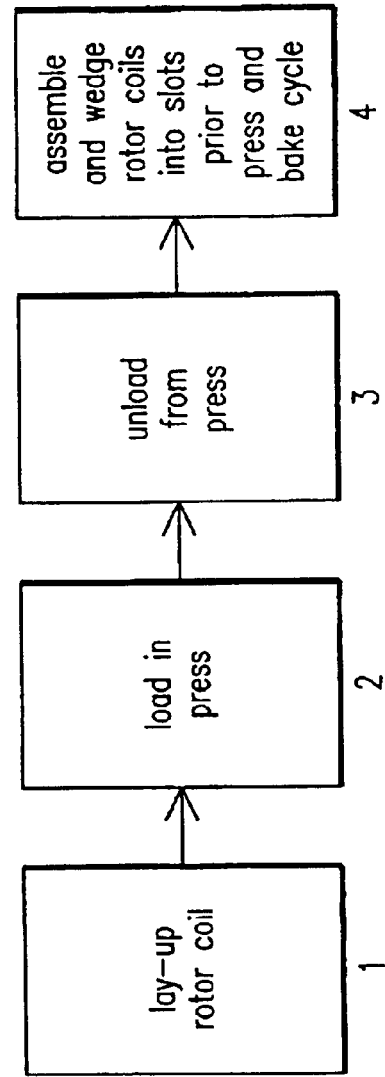
FIG. 3 is a flow chart of an exemplary rotor coil manufacturing process of the present invention.

Referring now also to FIG. 3, a flow diagram of an exemplary rotor coil manufacturing process of the present invention is shown. In Step 1, a nascent insulated strand is "laid-up" by arranging the adhesive 24 between the insulation 18 and conductor 16. Although a plurality (e.g. about 2–10) of insulators 18 and conductors 16 could be laid-up, it has been found advantageous to lay-up a single insulator 18 with a single conductor 16 to provide improved coil 10 uniformity (e.g., better control of process parameters, and more precise thermal and pressure gradient control throughout the laid-up materials 16, 18, 24). Also, although a padding is not required to sandwich the laid-up materials, such a padding could be used to further improve temperature and pressure uniformity.

In Step 2, the laid-up materials 16, 18, 24 or stack 19 are then loaded into a press that is preheated to about 100–300° C., preferably about 140–160° C. A pressure of about 5–100 PSI, preferably about 10–50 PSI, is then applied to the laid-up materials by the press for about 5–120 seconds, preferably about 15–45 seconds. This Step 2, tacks the adhesive and ensures sufficiently intimate contact between the conductor 16 and insulation 18 so that the stack 19 of now tacked insulated conductor or nascent coil 10 preferably can withstand the general rigors of transporting, storage and handling during typical manufacturing operations. The tack bond strength is preferably about 30–150 psi, more preferably about 50–100 psi. It has also been found advantageous to use a rubber-coated press bar to further improve temperature and pressure uniformity.

In Step 3, the stack 19 or nascent coil 10 is unloaded from the press. The nascent coil 10 can be optionally moved to a detailing area to trim insulation covering, ventilation slots, overlapping edges and the like. In Step 4, stacks 19 of nascent coil 10 are assembled into a rotor coil 10, and then tightly wedged or otherwise arranged within the rotor slots 12 prior to the requisite press and bake cycle necessary to consolidate the slot 12 contents. The press and bake cycle is typically performed during the rotor manufacturing processes to consolidate the slot 12 contents. The press and bake cycle is performed at about 100–500° C., preferably about 120–140° C., at a pressure of about 100–1,500 PSI, preferably about 900–1,000 PSI, for about 2–9 hours, preferably about 6–8 hours. The adhesive 24 of the tacked coils 10 is fully cured to design requirements within the rotor slots 12 by this press and bake cycle. The fully cured bond strength is preferably about 150–500 psi, more preferably about 200–300 psi. Thus, by using the press and bake cycle, which is already a requisite step in the rotor 14 manufacturing process, to also fully cure the adhesive 24 of the coils 10, rotor 14 manufacturing costs are reduced by dollars and manufacturing time is also reduced.

Figure 4:
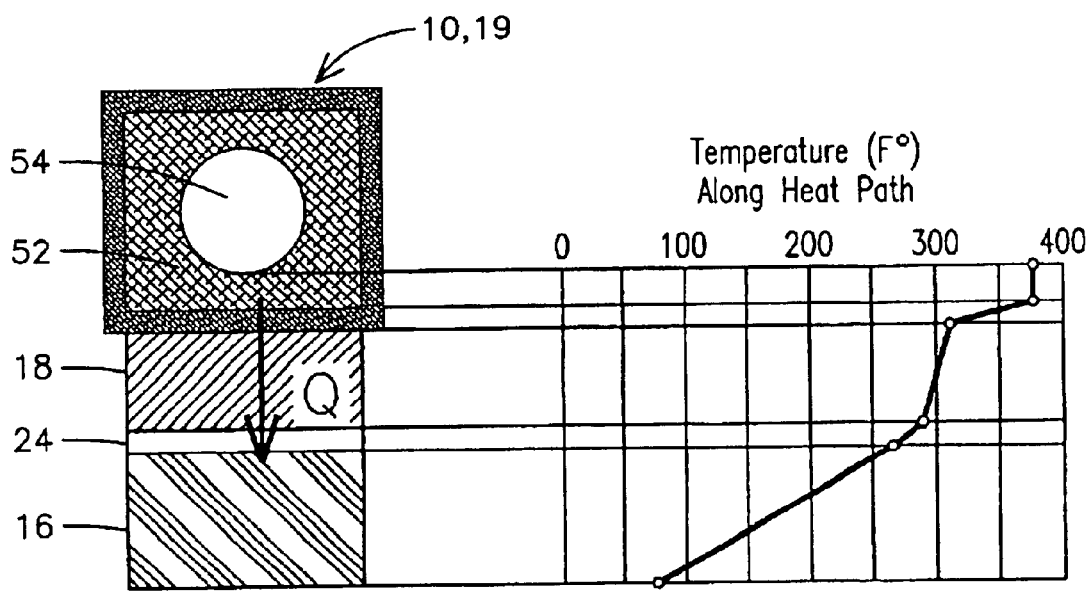
FIG. 4 is an integrated schematic diagram and chart showing an exemplary heat flow path.

FIG. 4 shows an exemplary heat flow path through the stack 19 or nascent coil 10. The diagram and chart depicts a heat source and a pressure source, such as a rubber coated press cylinder 52 and heater bar 54. Heat and pressure are transferred to the stack 19 and, more particularly, preferably first to the insulation 18, then to the adhesive 24 and then to the conductor 16. The exemplary heat flow path is shown at a snapshot of time, such as sometime between 5–60 seconds after the press 52 and heater 54 are applied to the insulation 18. As can be seen in the diagram and chart, the adhesive can attain a desired temperature (e.g. about 250–300° F., depending on the material used) for a desired period of time (e.g. about 2–120 seconds) to allow the adhesive to tack and ensure sufficiently intimate contact between the conductor and insulator. As can also been seen in the diagram and chart, the adhesive 24 preferably is a poorer thermoconductor than the insulation 18 to inhibit heat transfer to the conductor 16 and help cause heat buildup in the adhesive 24, thereby assisting adhesive tacking.

The heat flow path can be roughly considered as a thermal conductors in series, given that the heat flows from the heated press 52, 54 to the room temperature conductor 16. The rate of heat transfer can thus be generally considered as a function of thermal conductivity and layer thickness. As is known, for steady state flow:

$$Q=(T_2-T_1)Ki\, A/Li$$

Where: T is absolute temperature (Kelvin), $Ki$ is material thermal conductivity (W/m-K), A is the area that Q flow normal through ($m^2$), and $Li$ is material thickness (m).

Also, $Keq\, 1/\Sigma\, vi/Ki$=equivalent thermal conductivity of heat flow path, where $vi$ is the thickness (volume) fraction of the heat flow path.

Suitable values for Lrubber is about 0.5–1.0 mm, Linsulation is about 0.2–0.8 mm, Ladhesive is about 0.01–0.1 mm, and Lconductor is about 4–10 mm. Suitable values for Krubber is about 0.15–0.25 W/m-K, Kinsulation is about 0.3–0.4 W/m-K, Kadhesive is about 0.15–0.25 W/m-K and Kconductor is about 350–450 W/m-K. Approximately 850 W=Q is sufficient to cause the conductor surface $T_1$=400K (260° F.) with the heated press_at $T_2$=463K (375° F.). An A of about 0.01–0.05 $m^2$ has been found suitable. However, other values outside the above parameters may be easily used with the exemplary context of use and other contexts of use.

Figure 6:
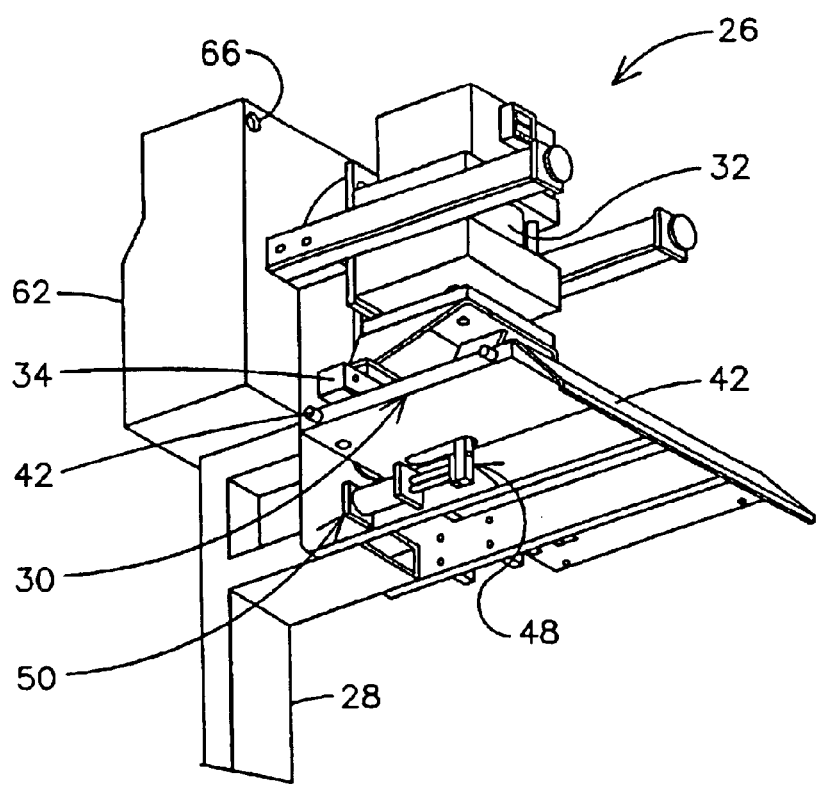
FIG. 6 is another perspective view of the apparatus of FIG. 5.
Figure 5:
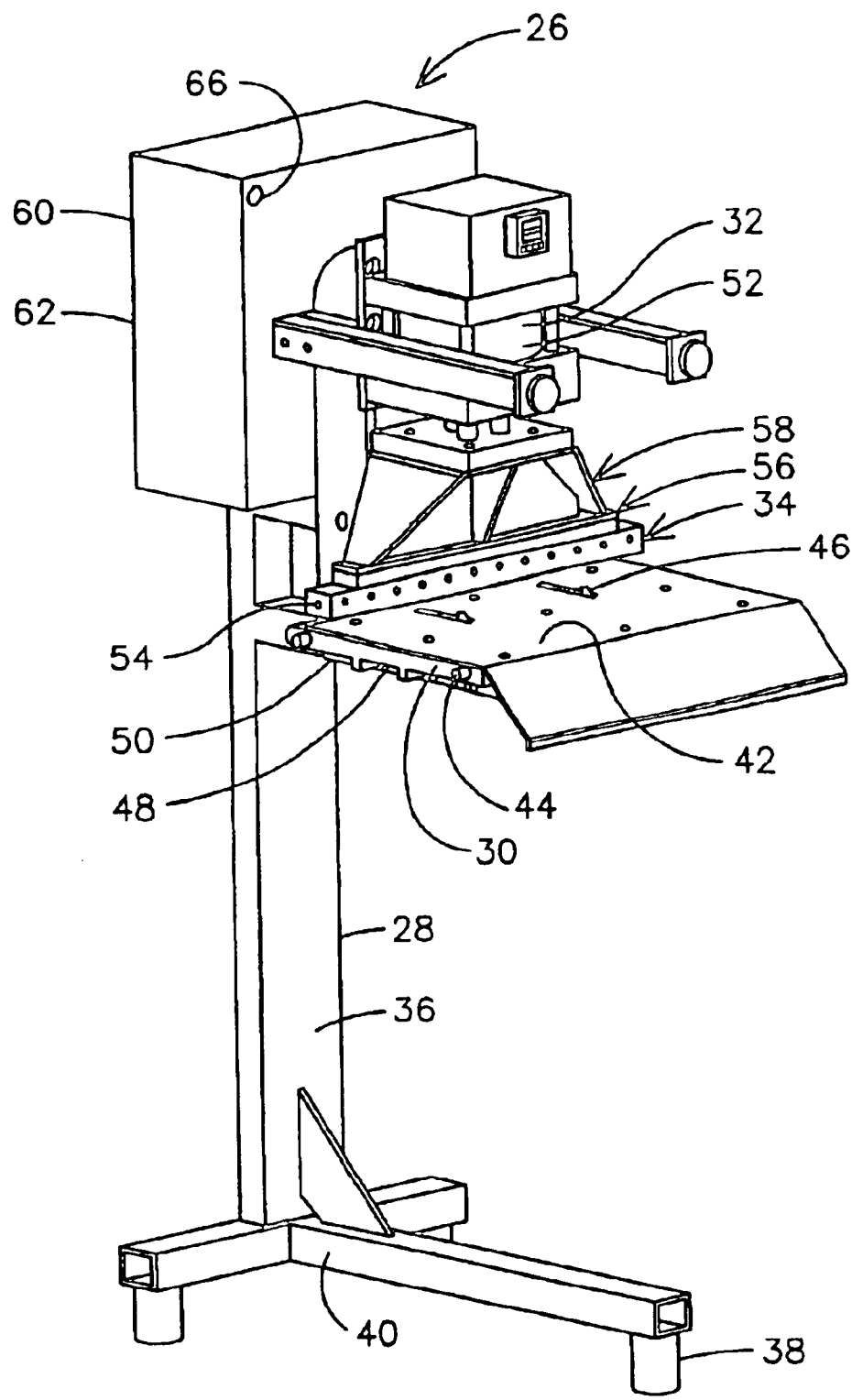
FIG. 5 is a perspective view of an exemplary apparatus capable of tacking two components.
Figure 7:
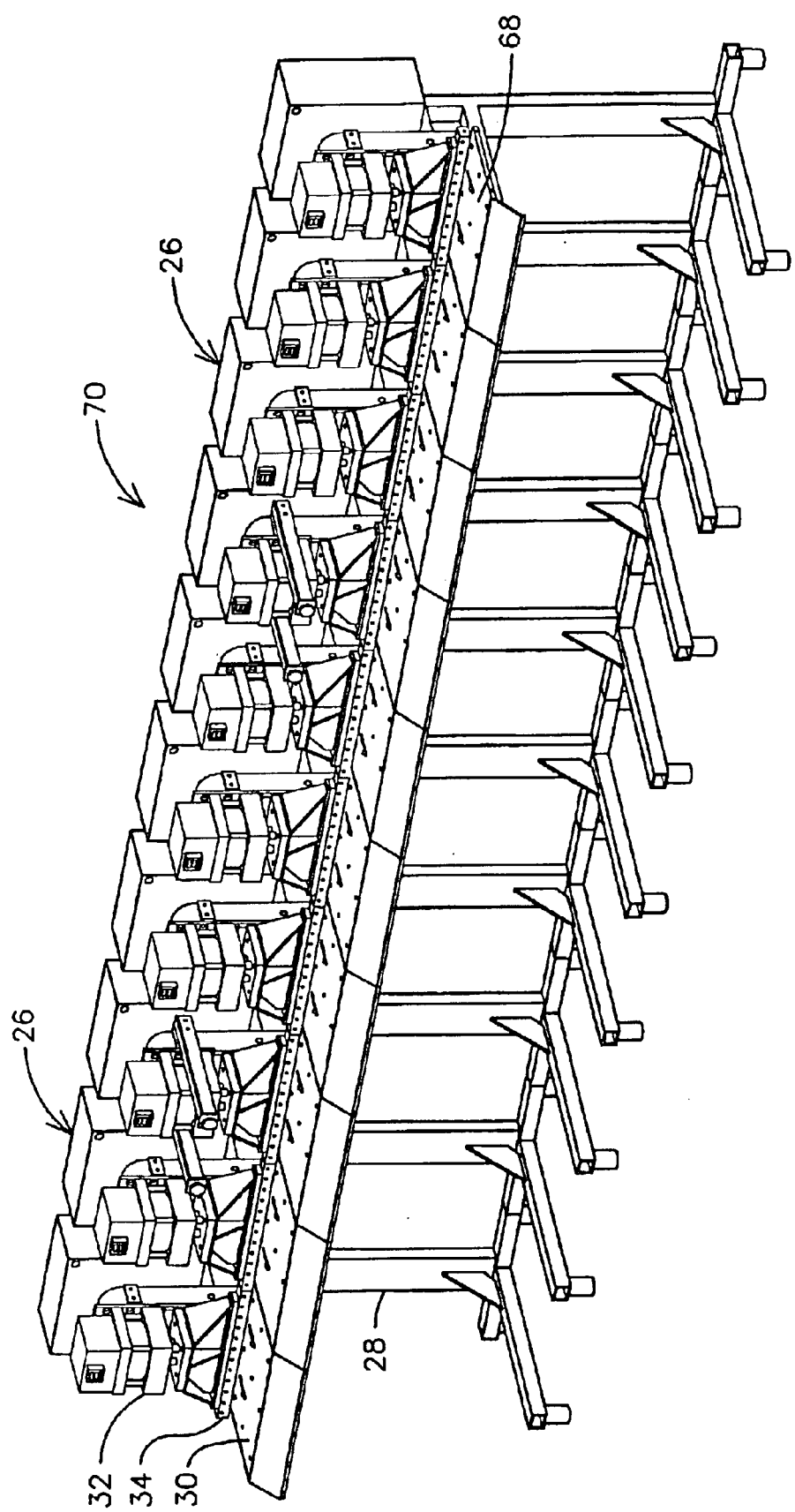
FIG. 7 is a perspective view of a plurality of axially aligned apparatus of FIG. 5, configured to tack two elongated components.

FIGS. 5 and 6 show an apparatus 26 capable of heat tacking a component or portion thereof, such as a portion of a laid-up rotor coil 10. The apparatus 26 advantageously includes a frame 28, a tray 30, a ram 32, and a heater 34. The frame 28 provides stability, support and elevation to the apparatus 26. The illustrated frame 28 has a vertical member 36, which is advantageously vertically adjustable by a telescoping member (not shown), nobs 38 and the like for ease of operation. A foot 40 provides stability and support to the apparatus 26. The frame 28 can be made of a variety of materials, such as metals and composites, to withstand the rigors of assembly line operation. There is no requirement, however, that the apparatus 26 include a frame 28. For example, the apparatus 26 can be used in a tabletop configuration where the tray 30 lies on a table or other elevated surface. For another example, the tray 30 can lie on a storage, controller or other type of cabinet or support.

A tray 30 is attached to the frame 28 at a desired height to provide a platform upon which at least a portion of the laid-up coil 10 can rest. A wear plate 42 and/or liner can be arranged on the tray 30 to reduce tray wear and inhibit coil 10 slippage. The wear plate 42 can also be angled toward the front to assist with on-loading and off-loading the coil 10. One or more coil positioning devices, such as dowel pins 44, can be used to help position and align the laid-up coil 10 on the tray 30. Similarly, one or more urgers, such as a spring loaded snapback protuberance 46, can be used to help keep the laid-up coil 10 secure once adjusted to a desired position on the tray 30. A spring plunger 48 and cylinder 50 can be used to push or urge together the components to be tacked.

A reciprocating ram 32 is attached to the frame 28 and positioned to provide an applied pressure toward the tray 30. The exemplary ram 32 is shown as a cylinder 52 having a diameter of about 5–10 inches, preferably about 7–9 inches, and capable of providing pressures of up to about 150 psi, preferably up to about 100 psi. The ram 32 can be driven by any suitable means, such as air or hydraulic.

The ram 32 drives a heater 34, which, in turn, transfers the applied pressure from it 34 to at least a portion of the laid-up coil 10 on the tray 30. The heater 34 can be configured in a variety of sizes and shapes, depending upon the component to be tacked. For example, if used with the exemplary laid-up coil 10, the heater 34 can be configured as a bar 54 that extends the length of the tray 30. The heater 34 may be directly attached to the ram 32 or coupled to the ram 32 by such elements as an insulator 56 to help thermally isolate the heater 34, and a weldment 58 to help space or occupy space between the ram 32 and heater 34. The heater 34 can be heated to temperatures of up to about 1,200° C., preferably about 800° C. by any suitable means, such as resistive and conductive heating.

By this configuration, the ram 32 and heater 34 can apply a pressure and temperature suitable to tack the laid-up coil 10 arranged on the tray 30 as explained above. The pressure and temperature are advantageously controlled by a programmable logic controller (PLC) 60, computer or other device based upon direct operator input, preprogrammed instruction and the like. The illustrated PLC 60 is located within a cabinet 62 to reduce undesirable contact with steam, dust and other debris, to provide operator lock-out, and the like.

The apparatus 26 also advantageously includes ergonomic and safety features for operator ease and assistance. For example, one safety feature uses a pair of push buttons 64 that are simultaneously pressed to engage the ram 32. Another safety feature uses an emergency stop button or bar (not shown) to stop the apparatus. An ergonomic feature involves a vertically adjustable frame, as explained above. Another ergonomic feature involves an easy-to-reach power button 66.

Referring to FIG. 6, a plurality of modular apparatus 26 are arranged, such as along a common axis, to provide an elongate linear, curved or curvilinear bed 68 having a desired length and configuration formed by the plurality of consecutively arranged trays 30. For example as shown, ten apparatus are arranged in-line, each having a tray 30 width of about two feet, to form an overall bed 68 of about twenty feet to easily accept and work a laid-up coil 10 of up to about twenty feet. Of course, each tray 30 need not have the same exemplary size and shape, but rather can have other sizes and shapes to form the desired linear, curved or curvilinear bed 68. Also, one or more PLCs 60 can be used to control the entire modular apparatus arrangement 70.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. It will be further understood that not all of the above-described aspects or elements are required to provide other strand assemblies or isolation layers, especially when used outside the generator or power generation field. Accordingly, the scope of the invention is intended to be defined only by the claims that follow.

What is claimed is:

1. A method of manufacturing a rotor coil for use within a generator of a power generation plant, comprising:

arranging an adhesive between a strand of conductive material and a strand of insulation material;

applying a temperature of about 100–300° C. and a pressure of about 5–100 psi for about 5–120 seconds to the adhesive in order to tack the adhesive to the conductive and insulation materials, thereby forming an insulated conductor stack;

assembling a plurality of stacks to form a nascent rotor coil;

arranging the nascent rotor coil in a rotor slot; and curing the adhesive after the coil is arranged within the rotor slot by a press and bake cycle.

2. The method of claim 1, wherein the adhesive comprises a thermoset material.

3. The method of claim 2, wherein the adhesive is selected from the group consisting of nitril, phenolic, epoxy, acrylic and the like.

4. The method of claim 1, wherein the tacking is performed at a temperature of about 140–160° C. and a pressure of about 10–50 psi for about 15–45 seconds.

5. The method of claim 1, wherein about 5–20 stacks are arranged to form the nascent rotor coil.

6. The method of claim 1, wherein the adhesive is fully cured during the press and bake cycle of the rotor coil manufacturing process.

* * * * *